(12) United States Patent
Yun et al.

(10) Patent No.: US 10,527,890 B2
(45) Date of Patent: Jan. 7, 2020

(54) LIQUID CRYSTAL DISPLAY AND MANUFACTURING METHOD THEREOF

(71) Applicant: Samsung Display Co., Ltd, Yongin-si, Gyeonggi-do (KR)

(72) Inventors: Sung-Jae Yun, Hwaseong-si (KR); Su Jin Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 7 days.

(21) Appl. No.: 15/059,136

(22) Filed: Mar. 2, 2016

(65) Prior Publication Data

US 2016/0259212 A1    Sep. 8, 2016

(30) Foreign Application Priority Data

Mar. 5, 2015    (KR) .................. 10-2015-0031194

(51) Int. Cl.
*C09K 19/56*    (2006.01)
*G02F 1/1337*    (2006.01)
(Continued)

(52) U.S. Cl.
CPC ........ *G02F 1/133711* (2013.01); *C09K 19/56* (2013.01); *G02F 1/1337* (2013.01); *G02F 1/1341* (2013.01); *G02F 1/133788* (2013.01); *G02F 1/134336* (2013.01); *G02F 2001/133715* (2013.01); *G02F 2001/133726* (2013.01); *G02F 2001/133742* (2013.01);
(Continued)

(58) Field of Classification Search
CPC .......................................... G02F 2001/133726
See application file for complete search history.

(56) References Cited

U.S. PATENT DOCUMENTS 8,514,357 B2    8/2013   Kim
8,619,222 B2    12/2013  Nakamura et al.
(Continued)

FOREIGN PATENT DOCUMENTS

JP    2011-186387 A    9/2011
JP    2012-163677 A    8/2012
(Continued)

OTHER PUBLICATIONS

EP16158626.8., EP Search Report, dated Jul. 26, 2016, 8 pages.

*Primary Examiner* — Chanceity N Robinson
(74) *Attorney, Agent, or Firm* — Innovation Counsel LLP

(57) ABSTRACT

A liquid crystal display includes: a first insulation substrate; a second insulation substrate facing the first insulation substrate; a liquid crystal layer between the first insulation substrate and the second insulation substrate; a pixel electrode on the first insulation substrate; a first alignment layer on the pixel electrode; a cross-linking portion where separation type of reactive mesogens in a surface of the first alignment layer are coupled with one another; a common electrode between the liquid crystal layer and the second insulation substrate; and a second alignment layer between the liquid crystal layer and the common electrode; and wherein liquid crystal molecules to be adjacent to the first alignment layer and liquid crystal molecules to be adjacent to the second alignment layer have different pre-tilt angles, and wherein at least one of the separation type of reactive mesogens is coupled with an ammonium-based material.

13 Claims, 19 Drawing Sheets

(51) Int. Cl.
  *G02F 1/1341* (2006.01)
  *G02F 1/1343* (2006.01)
(52) U.S. Cl.
  CPC ............ *G02F 2001/133746* (2013.01); *G02F 2001/133773* (2013.01); *G02F 2001/134345* (2013.01)

(56) References Cited

U.S. PATENT DOCUMENTS

| | | |
|---|---|---|
| 8,632,862 B2 | 1/2014 | Kim |
| 8,830,428 B2 | 9/2014 | Miyakawa et al. |
| 2011/0134382 A1 | 6/2011 | Miyakawa et al. |
| 2011/0157531 A1 | 6/2011 | Suwa et al. |
| 2012/0249940 A1* | 10/2012 | Choi et al. |
| 2013/0077038 A1* | 3/2013 | Rho et al. |
| 2013/0101755 A1 | 4/2013 | Lee et al. |
| 2015/0008373 A1* | 1/2015 | Smith et al. |
| 2015/0029455 A1 | 1/2015 | Kim et al. |
| 2016/0202561 A1* | 7/2016 | Kong ................ G02F 1/133788 445/6 |

FOREIGN PATENT DOCUMENTS

| | | | |
|---|---|---|---|
| JP | 2012163677 A | * | 8/2012 |
| KR | 10-2010-0032323 A | | 3/2010 |
| KR | 10-2010-0084823 A | | 7/2010 |
| KR | 10-2012-0088010 A | | 8/2012 |
| KR | 10-2012-0135731 A | | 12/2012 |
| KR | 10-2013-0096456 A | | 8/2013 |
| KR | 10-2015-0012093 A | | 2/2015 |

* cited by examiner

|  | Main cure time | Pretilt |
|---|---|---|
| Comparison example | 800s | 88.8 |
| Exemplary embodiment | 1800s | 89.5 |
|  | 3600s | 89.6 |

FIG. 19

|  | Irradiating a non-electric field UV after main cure | Pretilt |
|---|---|---|
| Comparison example | 0J | 88.8 |
| Exemplary embodiment | 5J | 89.3 |
|  | 10J | 89.7 |

LIQUID CRYSTAL DISPLAY AND MANUFACTURING METHOD THEREOF

CROSS-REFERENCE TO RELATED APPLICATION

This application claims priority to and the benefit of Korean Patent Application No. 10-2015-0031194 filed in the Korean Intellectual Property Office on Mar. 5, 2015, the entire content of which is incorporated herein by reference.

BACKGROUND (a) Field

The present disclosure relates to a liquid crystal display and a manufacturing method thereof.

(b) Description of the Related Art

A liquid crystal display is a type of flat panel display that is widely used today. The liquid crystal display includes two display panel sheets in which field generating electrodes such as pixel electrodes and common electrodes are formed, and a liquid crystal layer interposed between the display panels. In the liquid crystal display, a voltage is applied to the field generating electrodes to generate an electric field in the liquid crystal layer. The electric field determines the alignment direction of liquid crystal molecules of the liquid crystal layer, and an image is displayed by controlling the polarization of incident light.

Among the LCDs, a vertical alignment (VA) mode LCD, which aligns LC molecules such that their long axes are perpendicular to the panels in the absence of an electric field, is receiving much attention. VA mode LCDs offer high contrast ratio and wide reference viewing angle.

In the vertical alignment (VA) mode liquid crystal display, to obtain the wide viewing angle, a plurality of domains in which the alignment directions of the liquid crystal molecules are different may be formed in one pixel. As such, as a means of forming the plurality of domains, a method of forming cutouts such as minute slits in the field generating electrode or forming protrusions on the field generating electrode, is used. In this method, the liquid crystals are aligned in a direction that is vertical to a fringe field by the fringe field formed between an edge of the cutout or the protrusion and the field generating electrode facing the edge, and thus a plurality of domains may be formed.

The vertically aligned (VA) mode liquid crystal display has poor lateral surface visibility as compared to front surface visibility, and in order to solve this, a method of dividing one pixel into two sub-pixels and making voltages of the two sub-pixels different is proposed.

Meanwhile, in order to implement the wide viewing angle and increase a response speed of the liquid crystals, a method of allowing the liquid crystals to have a pretilt in a state where an electric field is not applied has been developed. In order to allow the liquid crystals to have the pretilt in various directions, the pretilt may be formed by using an alignment layer where alignment directions are various or adding a reactive mesogen to the alignment layer or the liquid crystal layer and then irradiating light in a state where the electric field is applied.

Recently, to meet a demand for a large-sized liquid crystal display device and increase viewer's immersion and tension, curved displays have been introduced to the market. An edge of the display panel is fixed by a sealant. Therefore, when the display panel is bent, buckling occurs at a middle portion of the panel, such that alignment between two display plates of the display panel may be mismatched. This misalignment causes directions of pretilts, which are formed on the two display plates in a plurality of same directions, partially deviate from each other and form dark parts such as texture in a pixel, reducing display quality.

The above information disclosed in this Background section is only for enhancement of understanding of the background of the invention and therefore it may contain information that does not form the prior art that is already known in this country to a person of ordinary skill in the art.

SUMMARY

The present disclosure provides a liquid crystal display preventing display quality deterioration that is generated due to an alignment twist between two display panels in a curved display panel, and a manufacturing method thereof.

A liquid crystal display according to an exemplary embodiment includes: a first insulation substrate; a second insulation substrate facing the first insulation substrate; a liquid crystal layer disposed between the first insulation substrate and the second insulation substrate; a pixel electrode disposed on the first insulation substrate; a first alignment layer disposed on the pixel electrode; a cross-linking portion, the cross-linking portion being a portion where separation type of reactive mesogens disposed in a surface of the first alignment layer are coupled with one another; a common electrode disposed between the liquid crystal layer and the second insulation substrate; and a second alignment layer disposed between the liquid crystal layer and the common electrode; and wherein liquid crystal molecules disposed to be adjacent to the first alignment layer and liquid crystal molecules disposed to be adjacent to the second alignment layer have different pre-tilt angles, and wherein at least one of the separation type of reactive mesogens is coupled with an ammonium-based material.

The liquid crystal molecules disposed to be adjacent to the first alignment layer may have the pre-tilt angle of more than 80 degrees to less than 89 degrees with respect to the surface of the first alignment layer, and the liquid crystal molecules disposed to be adjacent to the second alignment layer may have the pre-tilt angle of more than 89 degrees to less than 90 degrees with respect to the surface of the second alignment layer.

The separation type of reactive mesogen and the ammonium-based material may be coupled to have a positive polarity.

The ammonium-based material may include one among tetramethylammonium hydroxide (TMAH), tetramethylammonium chloride (TMAC), or an alkylammonium series.

The separation type of reactive mesogen may include a photoreactive group.

The photoreactive group may include an acrylate-based monomolecule.

The acrylate-based monomolecule may include a fluorine aryl acrylate-based monomolecule.

Each of the first alignment layer and the second alignment layer may include a main chain and at least one side chain connected to the main chain, and the side chain may include at least one integration type of reactive mesogen side chain.

The integration type of reactive mesogen side chain may include at least one of an acryl or methacryl group on an end.

The main chain may include one selected from a group including polyimide, polyamic acid, polyamide, polyamicimide, polyester, polyethylene, polyurethane, and polystyrene.

The liquid crystal display may be curved.

The pixel electrode may include a first sub-pixel electrode and a second sub-pixel electrode including a cross-shape stem and a plurality of minute branches.

The pixel electrode may be divided into four sub-regions by the cross-shape stem.

The minute branches of each sub-region may extend in different directions.

A manufacturing method of a liquid crystal display according to an exemplary embodiment of the present invention includes: providing a lower panel coated with a first alignment layer; providing an upper panel coated with a second alignment layer; injecting liquid crystal molecules between the lower panel and the upper panel to form a display panel assembly; forming an electric field to the display panel assembly; irradiating ultraviolet rays to the display panel assembly while the electric field is formed to provide different pretilts to the liquid crystal molecules disposed to be adjacent to the first alignment layer and the liquid crystal molecules disposed to be adjacent to the second alignment layer; and bending the display panel assembly to have at least one curved surface.

The pretilt of the liquid crystal molecules disposed to be adjacent to the first alignment layer may be more than 80 degrees to less than 89 degrees, and the pretilt of the liquid crystal molecules disposed to be adjacent to the second alignment layer may be more than 89 degrees to less than 90 degrees.

A liquid crystal layer is formed by injecting the liquid crystal molecules between the lower panel and the upper panel, and the separation type of reactive mesogen and the ammonium-based material may be coupled, thereby having positive polarity.

The separation type of reactive mesogen and the ammonium-based material included in the liquid crystal layer may move toward the lower panel after forming the electric field to the display panel assembly.

The ammonium-based material may include one among tetramethylammonium hydroxide (TMAH), tetramethylammonium chloride (TMAC), or and alkylammonium series.

Each of the first alignment layer and the second alignment layer may include a main chain and at least one side chain connected to the main chain, and the side chain may include at least one integration type of reactive mesogen side chain.

The integration type of reactive mesogen side chain may include at least one of an acryl or methacryl group on an end.

Providing the upper panel may include: pre-heat treating the second alignment layer; and main heat treating the second alignment layer, wherein the main heat treatment may be performed for longer than 30 minutes.

Providing the upper panel may include irradiating non-electric field ultraviolet rays exposure process to the upper panel after the main heat treatment.

In addition to the technical objects, other characteristics and advantages will be described hereinafter, and will be clearly understood by a person skilled in the art in the technical field to which the disclosure pertains.

Although the liquid crystal display according to an exemplary embodiment is realized as a curved liquid crystal panel, a dark portion such as texture may be reduced or prevented on a screen.

In addition, other characteristics and advantages can be found through the exemplary embodiments.

BRIEF DESCRIPTION OF THE DRAWINGS

FIG. 19 and FIG. 20 is a view explaining a method forming a pre-tilt angle by irradiating a non-electric field ultraviolet rays exposure process to an upper panel.

DETAILED DESCRIPTION OF THE EMBODIMENTS

Figure 1:
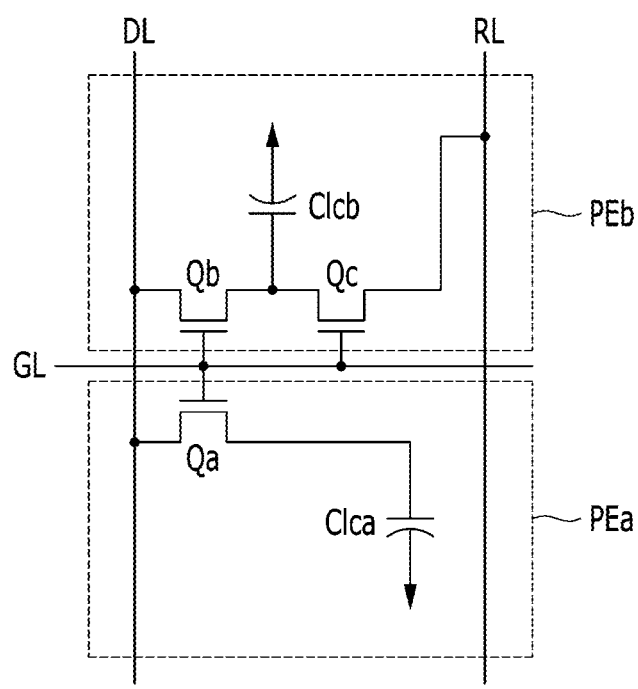
FIG. 1 is an equivalent circuit diagram of one pixel of a liquid crystal display according to an exemplary embodiment of the inventive concept.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a signal line, a pixel arrangement, and a driving method of a liquid crystal display according to an exemplary embodiment will be described with reference to FIG. 1.

FIG. 1 is an equivalent circuit diagram of one pixel of a liquid crystal display according to an exemplary embodiment.

Referring to FIG. 1, one pixel PX of the liquid crystal display according to the exemplary embodiment includes a plurality of signal lines including a gate line GL transferring a gate signal, a data line DL transferring a data signal, and a divided voltage reference voltage line RL transferring a divided voltage reference voltage, and first, second, and third switching elements Qa, Qb, and Qc, and first and second liquid crystal capacitors Clca and Clcb connected to the plurality of signal lines.

The first and second switching elements Qa and Qb are connected to the gate line GL and the data line DL, respectively, and the third switching element Qc is connected to an output terminal of the second switching element Qb and the divided voltage reference voltage line RL.

The first switching element Qa and the second switching element Qb are three-terminal elements such as a thin film transistor, a control terminal thereof is connected to the gate line GL, an input terminal thereof is connected to the data line DL, an output terminal of the first switching element Qa is connected to the first liquid crystal capacitor Clca, and an output terminal of the second switching element Qb is connected to the second liquid crystal capacitor Clcb and an input terminal of the third switching element Qc.

The third switching element Qc is also the three-terminal element such as the thin film transistor, a control terminal thereof is connected to the gate line GL, the input terminal thereof is connected to the second liquid crystal capacitor Clcb, and an output terminal thereof is connected to the divided voltage reference voltage line RL.

If a gate-on signal is applied to the gate line GL, the first switching element Qa, the second switching element Qb, and the third switching element Qc connected thereto are turned on. Accordingly, the data voltage applied to the data line DL is applied to the first sub-pixel electrode PEa and the second sub-pixel electrode PEb through the first switching element Qa and the second switching element Qb that are turned on. In this case, the data voltages applied to the first sub-pixel electrode PEa and the second sub-pixel electrode PEb are the same as each other, and the first liquid crystal capacitor Clca and the second liquid crystal capacitor Clcb are charged by the value determined by a difference between the common voltage and the data voltage. Simultaneously, the voltage charged in the second liquid crystal capacitor Clcb is divided through the turned-on third switching element Qc. Thereby, a value of the voltage charged in the second liquid crystal capacitor Clcb is reduced by a difference between the common voltage and the divided voltage reference voltage. That is, the voltage charged in the first liquid crystal capacitor Clca becomes higher than the voltage charged in the second liquid crystal capacitor Clcb.

Thus, the voltage charged in the first liquid crystal capacitor Clca and the voltage charged in the second liquid crystal capacitor Clcb become different from each other. Since the voltage of the first liquid crystal capacitor Clca and the voltage of the second liquid crystal capacitor Clcb are different from each other, inclination angles of liquid crystal molecules in a first sub-pixel and a second sub-pixel become different from each other. As a result, luminances of the two sub-pixels become different from each other. Accordingly, if the voltage of the first liquid crystal capacitor Clca and the voltage of the second liquid crystal capacitor Clcb are appropriately adjusted, an image viewed in a lateral surface may approach an image viewed in a front surface as closely as possible, and thus lateral surface visibility may be improved.

In the illustrated exemplary embodiment, in order to make the voltage charged in the first liquid crystal capacitor Clca and the voltage charged in the second liquid crystal capacitor Clcb different, the third switching element Qc connected to the second liquid crystal capacitor Clcb and the divided voltage reference voltage line RL is included, but in the case of the liquid crystal display according to another exemplary embodiment, the second liquid crystal capacitor Clcb may be connected to a step-down capacitor.

Specifically, the third switching element including a first terminal connected to a step-down gate line, a second terminal connected to the second liquid crystal capacitor Clcb, and a third terminal connected to a step-down capacitor may be included to charge a portion of an amount of electric charges charged in the second liquid crystal capacitor Clcb in the step-down capacitor and thus charge voltages between the first liquid crystal capacitor Clca and the second liquid crystal capacitor Clcb may be set to be different from each other. Further, in the case of a liquid crystal display according to another exemplary embodiment, a first liquid crystal capacitor Clca and a second liquid crystal capacitor Clcb may be connected to different data lines to receive different data voltages, and thus charge voltages between the first liquid crystal capacitor Clca and the second liquid crystal capacitor Clcb may be set to be different from each other. In addition, the charge voltages between the first liquid crystal capacitor Clca and the second liquid crystal capacitor Clcb may be set to be different from each other by various other methods.

Now, a structure of the liquid crystal display according to the exemplary embodiment illustrated in FIG. 1 will be briefly described with reference to FIG. 2 to FIG. 7.

Figure 2:
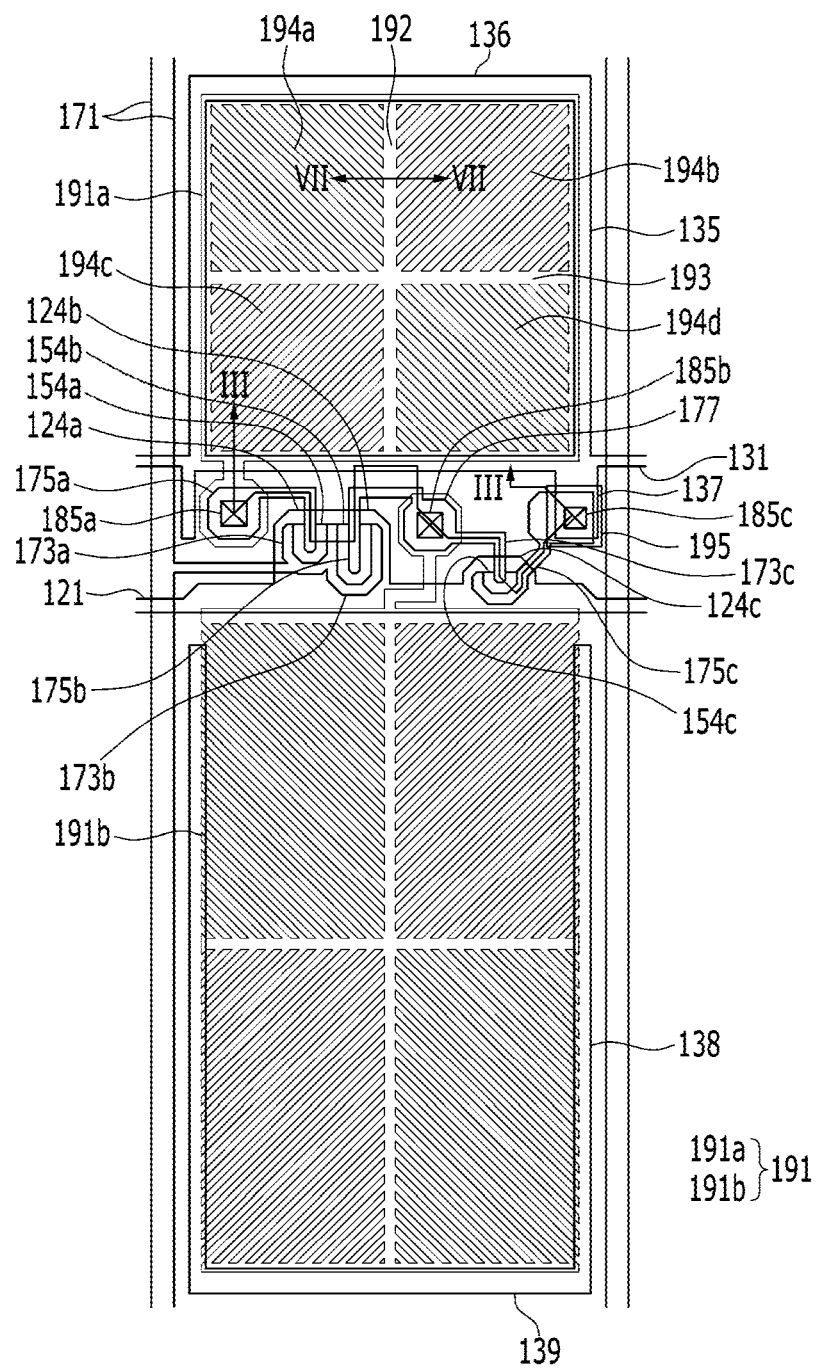
FIG. 2 is a layout view of one pixel of a liquid crystal display according to an exemplary embodiment of the inventive concept.
Figure 3:
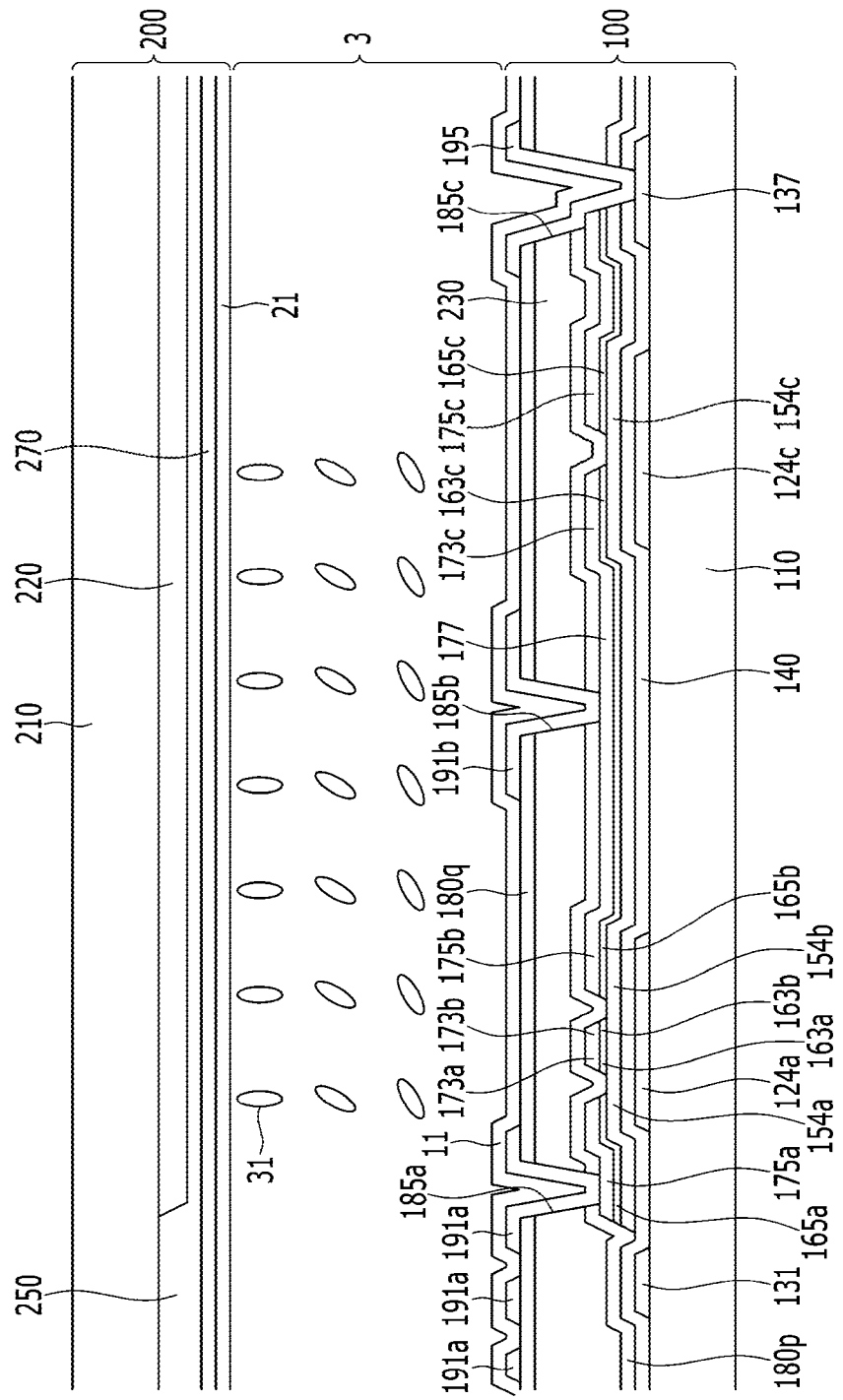
FIG. 3 is a cross-sectional view of the liquid crystal display of FIG. 2 taken along a line III-III.
Figure 4:
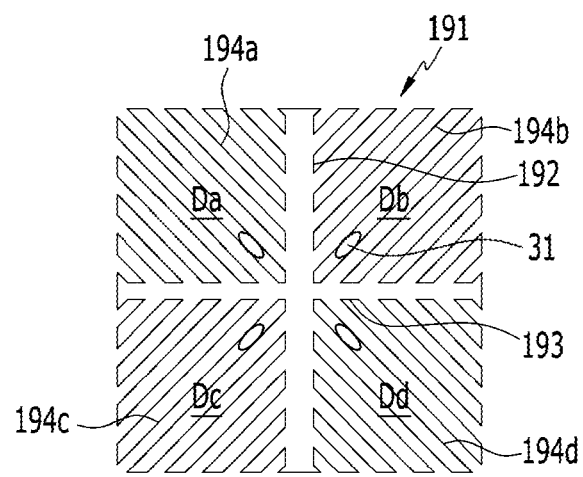
FIG. 4 is a top plan view showing a base region of a pixel electrode of a liquid crystal display according to an exemplary embodiment.
Figure 5:
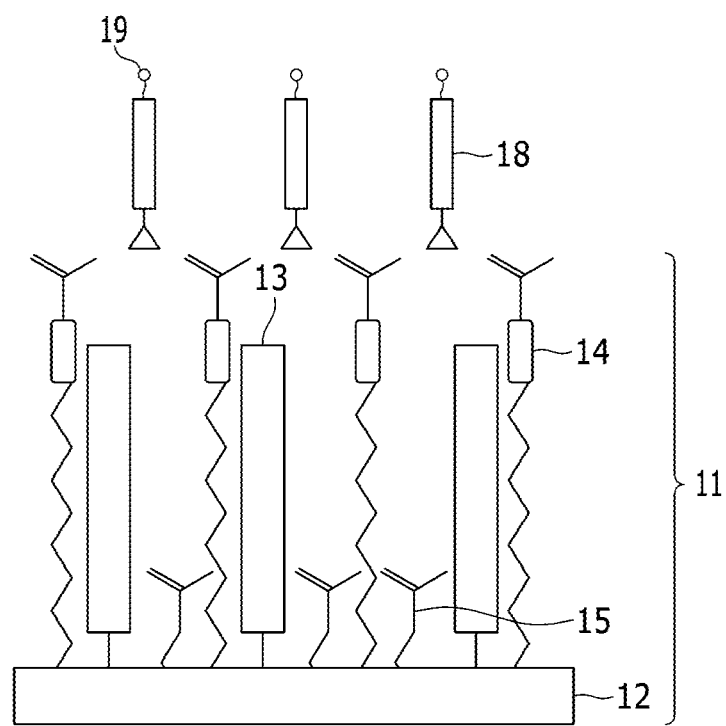
FIG. 5 is a diagram view showing a structure of a first alignment layer according to an exemplary embodiment.
Figure 6:
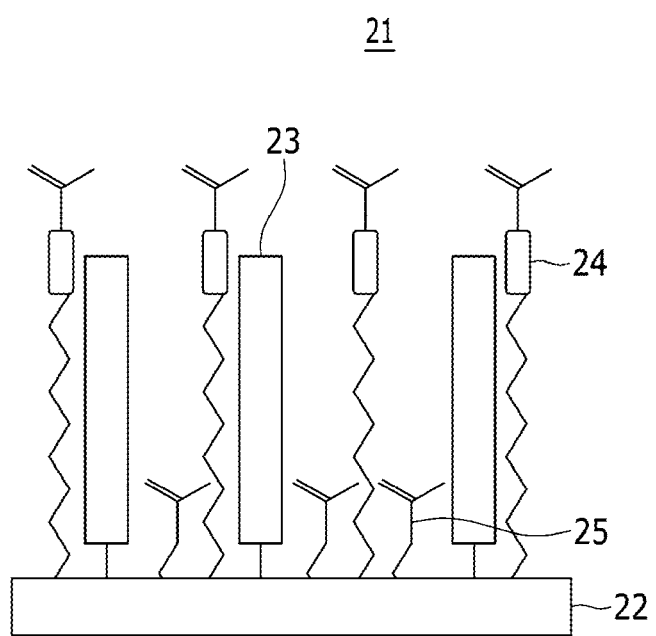
FIG. 6 is a diagram view showing a structure of a second alignment layer according to an exemplary embodiment.
Figure 7:
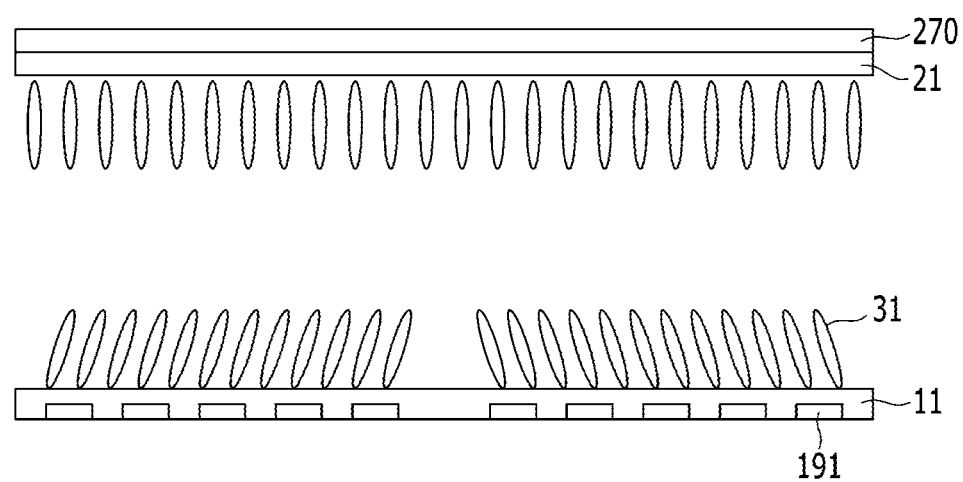
FIG. 7 is a schematic cross-sectional view of the liquid crystal display of FIG. 2 taken along a line VII-VII.

FIG. 2 is a layout view of one pixel of a liquid crystal display according to an exemplary embodiment of the present disclosure. FIG. 3 is a cross-sectional view of the liquid crystal display of FIG. 2 taken along a line III-III. FIG. 4 is a top plan view showing a base region of a pixel electrode of a liquid crystal display according to an exemplary embodiment. FIG. 5 is a diagram view showing a structure of a first alignment layer according to an exemplary embodiment. FIG. 6 is a diagram view showing a structure of a second alignment layer according to an exemplary embodiment. FIG. 7 is a schematic cross-sectional view of the liquid crystal display of FIG. 2 taken along a line VII-VII.

First, referring to FIG. 2 and FIG. 3, the liquid crystal display according to the present exemplary embodiment includes a lower display panel 100 and an upper display panel 200 facing each other, a liquid crystal layer 3 interposed between the two display panels 100 and 200, and a pair of polarizers (not illustrated) attached to outer surfaces of the display panels 100 and 200.

First, the lower display panel 100 will be described.

A gate conductor including a gate line 121 and a divided voltage reference voltage line 131 is formed on an insulating substrate 110 made of transparent glass, plastics, or the like.

The gate line 121 includes a first gate electrode 124*a*, a second gate electrode 124*b*, a third gate electrode 124*c*, and a wide end portion (not illustrated) for connection to another layer or an external driving circuit.

The divided voltage reference voltage line 131 includes first storage electrodes 135 and 136 and a reference electrode 137. Second storage electrodes 138 and 139 that are not connected to the divided voltage reference voltage line 131 but are disposed to overlap with a second sub-pixel electrode 191*b* are formed.

A gate insulating layer 140 is formed on the gate line 121 and the divided voltage reference voltage line 131.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b, and 154c.

A data conductor including a plurality of data lines 171 including a first source electrode 173a and a second source electrode 173b, a first drain electrode 175a, a second drain electrode 175b, a third source electrode 173c, and a third drain electrode 175c is formed on the ohmic contacts 163a, 165a, 163b, 165b, 163c, and 165c and the gate insulating layer 140.

The data conductor, and the semiconductors and the ohmic contacts disposed beneath the data conductor, may be formed simultaneously by using one mask.

The data line 171 includes a wide end portion (not illustrated) for connection with another layer or the external driving circuit.

The first gate electrode 124a, the first source electrode 173a, and the first drain electrode 175a form one thin film transistor (TFT) Qa together with the first semiconductor 154a, and a channel of the thin film transistor is formed in the semiconductor 154a between the first source electrode 173a and the first drain electrode 175a. Similarly, the second gate electrode 124b, the second source electrode 173b, and the second drain electrode 175b form one second thin film transistor Qb together with the second semiconductor 154b, and a channel is formed in the semiconductor 154b between the second source electrode 173b and the second drain electrode 175b, and the third gate electrode 124c, the third source electrode 173c, and the third drain electrode 175c form one third thin film transistor Qc together with the third semiconductor 154c, and a channel is formed in the semiconductor 154c between the third source electrode 173c and the third drain electrode 175c.

The second drain electrode 175b includes an expanded portion 177 connected to the third source electrode 173c and widely expanded.

A first passivation layer 180p is formed on the data conductors 171, 173c, 175a, 175b, and 175c and the exposed portion of the semiconductors 154a, 154b, and 154c. The first passivation layer 180p may include an inorganic insulating layer such as a silicon nitride or a silicon oxide. The first passivation layer 180p may prevent a pigment of a color filter 230 from flowing into the exposed portion of the semiconductors 154a, 154b, and 154c.

The color filter 230 is formed on the first passivation layer 180p. The color filter 230 extends in a vertical direction along two adjacent data lines.

However, the color filter 230 may be formed in the upper display panel 200 rather than the lower panel 100.

A second passivation layer 180q is formed on the color filter 230.

The second passivation layer 180q may include an inorganic insulating layer such as a silicon nitride or a silicon oxide. The second passivation layer 180q prevents peeling of the color filter 230, and suppresses contamination of the liquid crystal layer 3 by an organic material such as a solvent flowing from the color filter 230 to prevent defects such as afterimages that may occur when an image is driven.

A first contact hole 185a and a second contact hole 185b through which the first drain electrode 175a and the second drain electrode 175b are exposed are formed in the first passivation layer 180p and the second passivation layer 180q.

A third contact hole 185c through which a portion of the reference electrode 137 and a portion of the third drain electrode 175c are exposed is formed in the first passivation layer 180p, the second passivation layer 180q, and the gate insulating layer 140, and the third contact hole 185c is covered by a connecting member 195. The connecting member 195 electrically connects the reference electrode 137 and the third drain electrode 175c exposed through the third contact hole 185c.

A plurality of pixel electrodes 191 are formed on the second passivation layer 180q. The pixel electrodes 191 are separated from each other while the gate line 121 is interposed therebetween, each of the pixel electrodes 191 includes a first sub-pixel electrode 191a and the second sub-pixel electrode 191b adjacent in a column direction-based on the gate line 121, and the pixel electrode 191 may be made of a transparent conductive material such as ITO or IZO or a reflective metal such as aluminum, silver, chromium, or an alloy thereof.

The first sub-pixel electrode 191a and the second sub-pixel electrode 191b each include a basic electrode 191 illustrated in FIG. 4 or one or more modifications thereof.

The first sub-pixel electrode 191a and the second sub-pixel electrode 191b are physically and electrically connected through the first contact hole 185a and the second contact hole 185b to the first drain electrode 175a and the second drain electrode 175b, respectively. Here, the first sub-pixel electrode 191a and the second sub-pixel electrode 191b receive a data voltage from the first drain electrode 175a and the second drain electrode 175b, respectively. In this case, a portion of the data voltage applied to the second drain electrode 175b is divided through the third source electrode 173c, and thus a magnitude of a voltage applied to the first sub-pixel electrode 191a is larger than a magnitude of a voltage applied to the second sub-pixel electrode 191b.

The first sub-pixel electrode 191a and the second sub-pixel electrode 191b to which the data voltage is applied generate an electric field together with a common electrode 270 of the upper display panel 200 to determine a direction of the liquid crystal molecules of the liquid crystal layer 3 between the two electrodes 191 and 270. The luminance of light passing through the liquid crystal layer 3 is changed according to the thusly determined direction of the liquid crystal molecules.

A first alignment layer 11 is disposed on the pixel electrode 191. As shown in FIG. 5, the first alignment layer 11 may include a main chain 12 and at least one side chain connected to the main chain 12. The at least one side chain includes one or more vertical alignment side chains 13 and one or more integration type of reactive mesogen side chains 14, 15. Reactive mesogens 18 coupled to an ammonium-based material 19 are disposed on the first alignment layer 11. The reactive mesogens 18 are coupled with one another by irradiating ultraviolet rays to form a cross-linking portion (not shown) adjacent to a surface of the first alignment layer 11.

In this case, liquid crystal molecules 31 disposed on the first alignment layer 11 may have a pre-tilt angle of more than 80 degrees to less than 89 degrees with respect to the surface of the first alignment layer 11. The first alignment layer 11 will be described in detail later.

Now, the basic electrode 191 will be described with reference to FIG. 4.

As illustrated in FIG. 4, an entire shape of the basic electrode 191 is a quadrangle, and the basic electrode 191 includes a cross-shaped stem portion formed of a horizontal stem portion 193 and a vertical stem portion 192 that is orthogonal thereto. Further, the basic electrode 191 is divided into a first sub-region Da, a second sub-region Db, a third sub-region Dc, and a fourth sub-region Dd by the horizontal stem portion 193 and the vertical stem portion 192, and each of the sub-regions Da to Dd includes a plurality of first fine branch portions 194a, a plurality of second fine branch portions 194b, a plurality of third fine branch portions 194c, and a plurality of fourth fine branch portions 194d.

The first fine branch portion 194a extends obliquely in an upper left direction from the horizontal stem portion 193 or the vertical stem portion 192, and the second fine branch portion 194b extends obliquely in an upper right direction from the horizontal stem portion 193 or the vertical stem portion 192. Further, the third fine branch portion 194c extends in a lower left direction from the horizontal stem portion 193 or the vertical stem portion 192, and the fourth fine branch portion 194d extends obliquely in a lower right direction from the horizontal stem portion 193 or the vertical stem portion 192.

The first to fourth fine branch portions 194a, 194b, 194c, and 194d form an angle of about 45° or 135° to the gate lines 121a and 121b or the horizontal stem portion 193. Further, the fine branch portions 194a, 194b, 194c, and 194d of the two adjacent sub-regions Da, Db, Dc, and Dd may be orthogonal to each other.

Widths of the fine branch portions 194a, 194b, 194c, and 194d may be 2.5 to 5.0 µm, and a gap between the adjacent fine branch portions 194a, 194b, 194c, and 194d in one sub-region Da, Db, Dc, or Dd may be 2.5 to 5.0 µm.

According to another exemplary embodiment, the widths of the fine branch portions 194a, 194b, 194c, and 194d may be increased as the fine branch portions become closer to the horizontal stem portion 193 or the vertical stem portion 192, and a difference between the largest width portion and the narrowest portion in one fine branch portion 194a, 194b, 194c, or 194d may be 0.2 to 1.5 µm.

The first sub-pixel electrode 191a and the second sub-pixel electrode 191b are connected through the first contact hole 185a and the second contact hole 185b to the first drain electrode 175a or the second drain electrode 175b, and receive a data voltage from the first drain electrode 175a and the second drain electrode 175b. In this case, sides of the first to fourth fine branch portions 194a, 194b, 194c, and 194d distort an electric field to generate a horizontal component determining an inclination direction of the liquid crystal molecules 31. The horizontal components of the electric field are almost horizontal to the sides of the first to fourth fine branch portions 194a, 194b, 194c, and 194d. Therefore, as illustrated in FIG. 4, the liquid crystal molecules 31 are inclined in a direction that is parallel to length directions of the fine branch portions 194a, 194b, 194c, and 194d. Since one pixel electrode 191 includes four sub-regions Da to Dd in which length directions of the fine branch portions 194a, 194b, 194c, and 194d are different from each other, the directions where the liquid crystal molecules 31 are inclined are about four directions, and four domains where the alignment directions of the liquid crystal molecules 31 are different from each other are formed in the liquid crystal layer 3. As described above, if the inclination directions of the liquid crystal molecules are diversified, a reference viewing angle of the liquid crystal display is increased.

Next, the upper panel 200 will be described.

Referring to FIG. 2 and FIG. 3, a black matrix 220 is formed between a second insulation substrate 210 and the liquid crystal layer 3. The black matrix 220 is formed in the upper panel 200 while corresponding to the region in which the data line of the lower panel 100 is formed and the transistor is formed. However, it is not limited thereto, and in another exemplary embodiment, the black matrix 220 may be formed in the lower panel 100 while corresponding to the region in which the data line is formed and the transistor is formed.

An overcoat 250 is formed between the black matrix 220 and the liquid crystal layer 3. The overcoat 250 may be omitted.

The common electrode 270 is formed between the overcoat 250 and the liquid crystal layer 3. A second alignment layer 21 is formed between the common electrode 270 and the liquid crystal layer 3. A portion adjacent to a surface of the second alignment layer 21 may not include the cross-linking portion stated earlier referring FIG. 5, which is formed by irradiating reactive mesogens 18 coupled to an ammonium-based material 19 with ultraviolet rays.

The liquid crystal molecules 31 disposed on the second alignment layer 21 may have a pre-tilt angle more than 89 degrees to less than 90 degrees with respect to the surface of the second alignment layer 21. The second alignment layer 21 will be described in detail later.

The liquid crystal layer 3 has negative dielectric anisotropy, the liquid crystal molecules 31 of the liquid crystal layer 3 disposed on the lower display panel 100 are arranged such that their long axes are aligned to have the pre-tilt angle of more than 80 degrees to less than 89 degrees with respect to the surface of the alignment layer 11 in the absence of the electric field, and the liquid crystal molecules 31 of the liquid crystal layer 3 disposed on the upper display panel 200 are arranged such that their long axes are aligned to have the pre-tilt angle of more than 89 degrees to less than 90 degrees with respect to the surface of the second alignment layer 21 in the absence of the electric field.

Next, the first alignment layer 11 of the lower panel 100 will be described with reference to FIG. 5. FIG. 5 is a diagram view showing a structure of the first alignment layer 11 according to an exemplary embodiment.

Referring to FIG. 5, the first alignment layer 11 may include a main chain 12 and at least one side chain connected to the main chain 12, at least one side chain may include one or more vertical alignment side chains 13 and one or more integration type of reactive mesogen side chains, and the integration type of reactive mesogen side chain may include a main reactive mesogen side chain 14 and a sub-reactive mesogen side chain 15.

The integration type of reactive mesogen side chain is composed of the main reactive mesogen side chain 14 and the sub-reactive mesogen side chain 15, and a length of the main reactive mesogen side chain 14 may be longer than the length of the sub-reactive mesogen side chain 15. That is, 'the main reactive mesogen side chain' indicates the reactive mesogen side chain having the longer length among the reactive mesogen side chain connected to the main chain, and 'the sub-reactive mesogen side chain' indicates the reactive mesogen side chain having the shorter length among the reactive mesogen side chain connected to the main chain. However, in another exemplary embodiment, only one reactive mesogen side chain may exist.

The main chain may be a polyimide main chain. However, it is not limited thereto. The main chain may include at least one of polyimide, polyamic acid, polyamide, polyamicimide, polyester, polyethylene, polyurethane, and polystyrene. As the main chain includes more ring structures such as an imide group, rigidity of the main chain may be enhanced and the electrical characteristics may be improved, and accordingly stains that may be generated when driving the liquid crystal display for a long time may be reduced, and stability for the pretilt of the alignment layer may be enhanced.

At least one side chain is connected to a diamine group among the main chain. The diamine may be a photo-reactive diamine, a vertical diamine, or a normal diamine. At least one diamine among the photo-reactive diamine, the vertical diamine, and the normal diamine may be used for manufacturing the alignment layer. Also, one or more kinds of photo-reactive diamine may be used for manufacturing the alignment layer, one or more kinds of vertical diamine may be used, and one or more kinds of normal diamine may be used. By adjusting a composition ratio of the copolymer of the photo-reactive diamine, the vertical diamine, and the normal diamine, optimization of the vertical alignment characteristic and alignment stability are possible.

At least one side chain includes one or more kinds of vertical alignment side chain and one or more kinds of integration type of reactive mesogen side chain. The vertical alignment side chain performs a function of obtaining a vertical alignment force in the VA mode.

The vertical alignment side chain may include at least one mesogen unit to obtain the vertical alignment force. The mesogen unit may include at least one selected from a group including a cholesteric group, a biphenyl group, a cyclohexyl benzene group, and a naphthyl group.

The main reactive mesogen side chain and sub-reactive mesogen side chain may include at least one of an acryl or a methacryl group on an end. The acryl or the methacryl group forms a polymer by photo-polymerization when irradiating ultraviolet rays.

The photo-polymerization reaction may be generated between the main reactive mesogen side chains, the sub-reactive mesogen side chains, and the main reactive mesogen side chain and the sub-reactive mesogen side chain. Accordingly, more reaction may be generated compared with a case that only one reactive mesogen side chain exists. These reactive mesogen side chains may react with each other in the ultraviolet ray irradiation process.

The separation type of reactive mesogen 18 separated from the first alignment layer 11 and the ammonium-based material 19 connected to the reactive mesogen 18 may be disposed on the surface of the first alignment layer 11.

The separation type of reactive mesogen 18 may include the diamine group, a flexible functional group, and a photo-reactive group. For example, in the separation type of reactive mesogen 18, the flexible functional group may be coupled to the diamine group, and the photo-reactive group may be coupled to the flexible functional group. Also, the separation type of reactive mesogen 18 may not include the flexible functional group.

A chemical structure of the separation type of reactive mesogen 18 may be a photo-reactive dimethacrylate-based monomolecule represented by a Structural Formula XVI-R, and in detail, the monomolecule represented by the Structural Formula represented by the Structural Formula XVII-R1, XVII-R2, XVII-R3, XVII-R4, XVII-R5, or XVII-R6.

Structural Formula XVI-R

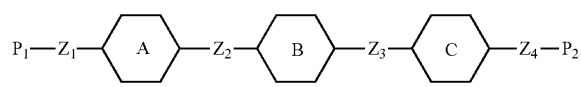

Here, A, B, and C may be one selected among a benzene ring, a cyclohexyl ring, and a naphthalene ring. An outer hydrogen atom of each ring forming A, B, and C may not be substituted or at least one of hydrogen atoms thereof may be substituted into an alkyl, fluorine (F), chlorine (Cl), or methoxy group ($OCH_3$). P1 and P may be one selected from a group including an acrylate, a methacrylate, an epoxy, oxetane, vinyl-ether, styrene, and thiophene. Z1, Z2, and Z3 may be a single combination, a linkage group, or a combination of the linkage group. The single combination means that A, B, and C are directly coupled with an intermediate material between A, B, and C. The linkage group may be —OCO—, —COO—, an alkyl group, —O—, or a linkage group that may be easily used by those who are skilled in the art.

The separation type of reactive mesogen 18 according to an exemplary embodiment of the present invention may be, in detail, the monomolecule represented by the Structural Formula XVII-R1, XVII-R2, XVII-R3, XVII-R4, XVII-R5, or XVII-R6.

Structural Formula XVII-R1

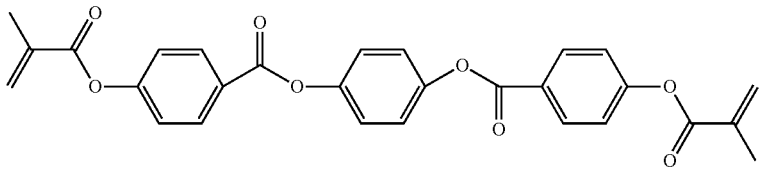

Structural Formula XVII-R2

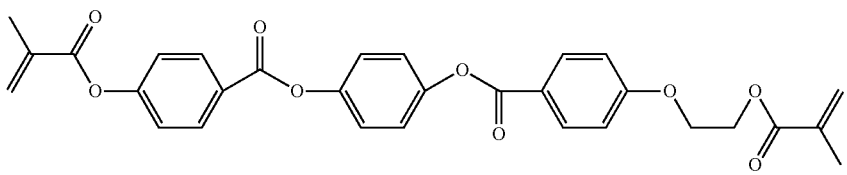

-continued

Structural Formula XVII-R3

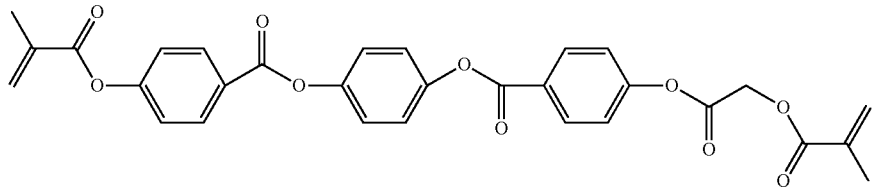

Structural Formula XVII-R4

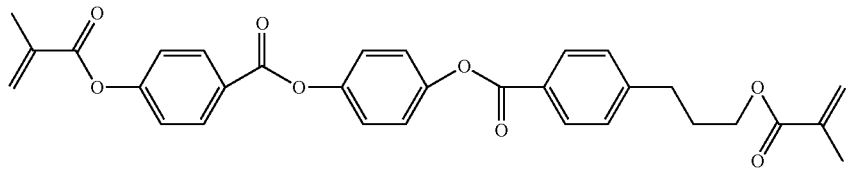

Structural Formula XVII-R5

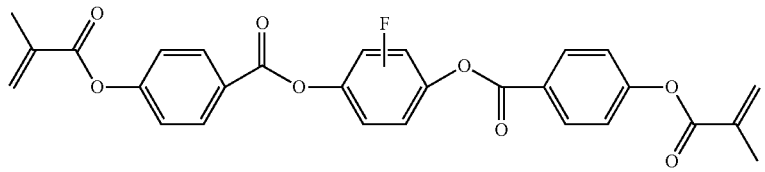

Structural Formula XVII-R6

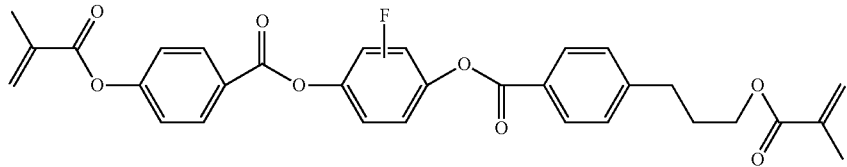

According to an exemplary embodiment, the acrylate-based monomolecule may be a fluorinated aryl acrylate-based monomolecule, and may be selected from the Structural Formula XVI-F-P2-11, XVI-F-P2-21, XVI-F-P2-22, XVI-F-P2-23, XVI-F-P2-31, XVI-F-P2-32, XVI-F-P2-41, and mixtures thereof.

Structural Formula XVI-F-P2-11

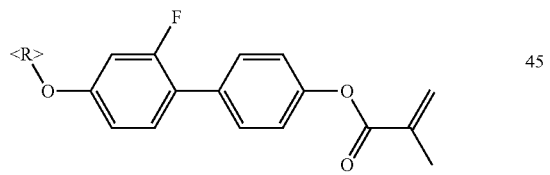

Structural Formula XVI-F-P2-21

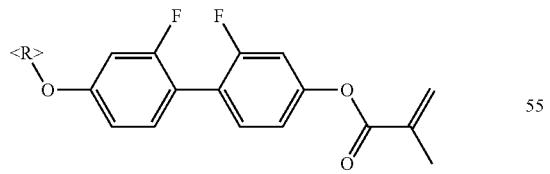

Structural Formula XVI-F-P2-22

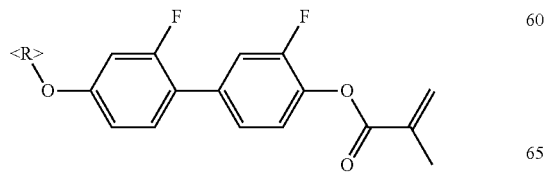

-continued

Structural Formula XVI-F-P2-23

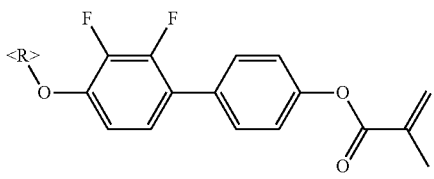

Structural Formula XVI-F-P2-31

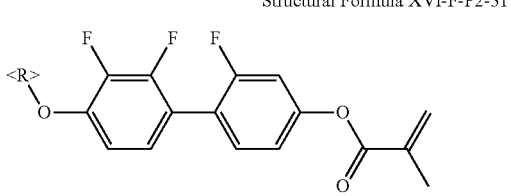

Structural Formula XVI-F-P2-32

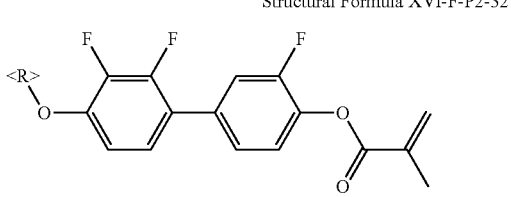

Structural Formula XVI-F-P2-41

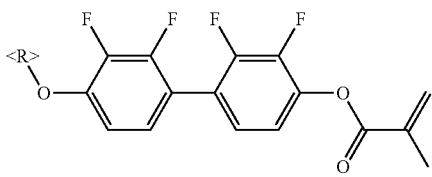

The fluorinated aryl acrylate-based monomolecule includes fluorine (F) such that the movement of the separation type of reactive mesogen 18 may be accelerated depending on a polarity of the electric field applied from the outside.

The photoreactive group may be coupled to another photoreactive group by photo-irradiation of ultraviolet rays to form a coupling part (not shown) representing the pretilt. In detail, if ultraviolet rays are irradiated, the coupling part is formed while the diamine compound unit including the reactive mesogen 15 is polymerized with the photoreactive group of other diamine compound units, and this maintains the liquid crystal molecules 31 in the pretilted state.

The separation type of reactive mesogen 18 is coupled with the ammonium-based material 19.

The ammonium-based material 19 may include any one of tetramethylammonium hydroxide (TMAH) represented by Chemical Formula 1, tetramethylammonium chloride (TMAC) represented by Chemical Formula 2, and alkylammonium series. For example, the alkylammonium series may include one among alkylammoniums represented by Chemical Formula 3, dialkylammoniums represented by Chemical Formula 4, trialkylammoniums represented by Chemical Formula 5, and etraalkylammoniums represented by Chemical Formula 6.

(Chemical Formula 1)

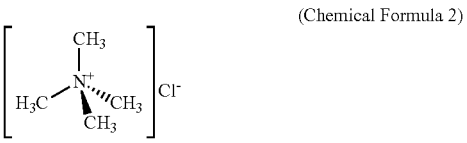
(Chemical Formula 2)

(Chemical Formula 3)

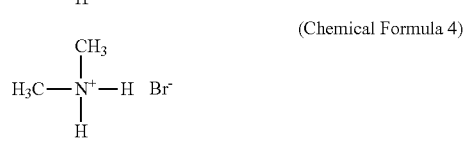
(Chemical Formula 4)

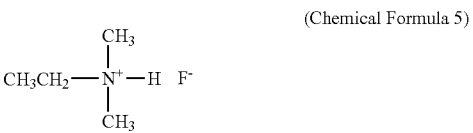
(Chemical Formula 5)

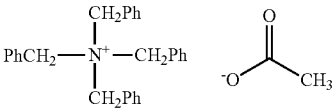
(Chemical Formula 6)

The separation type of reactive mesogen 18 and the ammonium-based material 19 are coupled, thereby having a positive polarity (+). The coupling unit of the separation type of reactive mesogen 18 and the ammonium-based material 19 is biased and is moved in one direction by the external electric field.

Next, the second alignment layer 21 of the upper panel 200 will be described with reference to FIG. 6. FIG. 6 is a diagram showing a structure of the second alignment layer 21 according to an exemplary embodiment. For the second alignment layer 21, the description of the same configurations as in the alignment layer 11 is omitted.

Referring to FIG. 6, the second alignment layer 21 may include a main chain 22 and at least one side chain connected to the main chain 22, the at least one side chain may include one or more kinds of vertical alignment side chains 23 and one or more kinds of integration type of reactive mesogen side chains, and the integration type of reactive mesogen side chains may include a main reactive mesogen side chain 24 and a sub-reactive mesogen side chain 25.

Here, the separation type of reactive mesogen 18 coupled to the ammonium-based material 19 as shown in FIG. 5 is not disposed on the surface of the second alignment layer 21 such that the cross-linking portion is not formed.

Referring to FIG. 7, the liquid crystal molecules 31 disposed to be adjacent to the first alignment layer 11 and the liquid crystal molecules 31 disposed to be adjacent to the second alignment layer 21 may have different pre-tilt angles.

In this case, the liquid crystal molecules 31 disposed to be adjacent to the first alignment layer 11 have the pre-tilt angle of more than 80 degrees to less than 89 degrees with respect to the surface of the first alignment layer 11, and the liquid crystal molecules 31 disposed to be adjacent to the second alignment layer 21 have the pre-tilt angle of more than 89 degrees to less than 90 degrees with respect to the surface of the second alignment layer 21.

For the integration type of reactive mesogen side chain included in the first alignment layer 11 and the separation type of reactive mesogen 18 disposed on the surface of the first alignment layer 11, the liquid crystal molecules 31 disposed to be adjacent to the first alignment layer 11 may have the pre-tilt angle of more than 80 degrees to less than 89 degrees by the electric field UV.

Since the integration type of reactive mesogen side chain included in the second alignment layer 21 loses reactivity and the separation type of reactive mesogen does not exist on the surface of the second alignment layer 21, the liquid crystal molecules 31 disposed to be adjacent to the second alignment layer 21 may have the pre-tilt angle of more than 89 degrees to less than 90 degrees.

Next, generation of visual artifacts such as texture of dark portions when the conventional liquid crystal display is used in a curved liquid crystal panel will be described with reference to FIG. 8 and FIG. 9.

Figure 8:
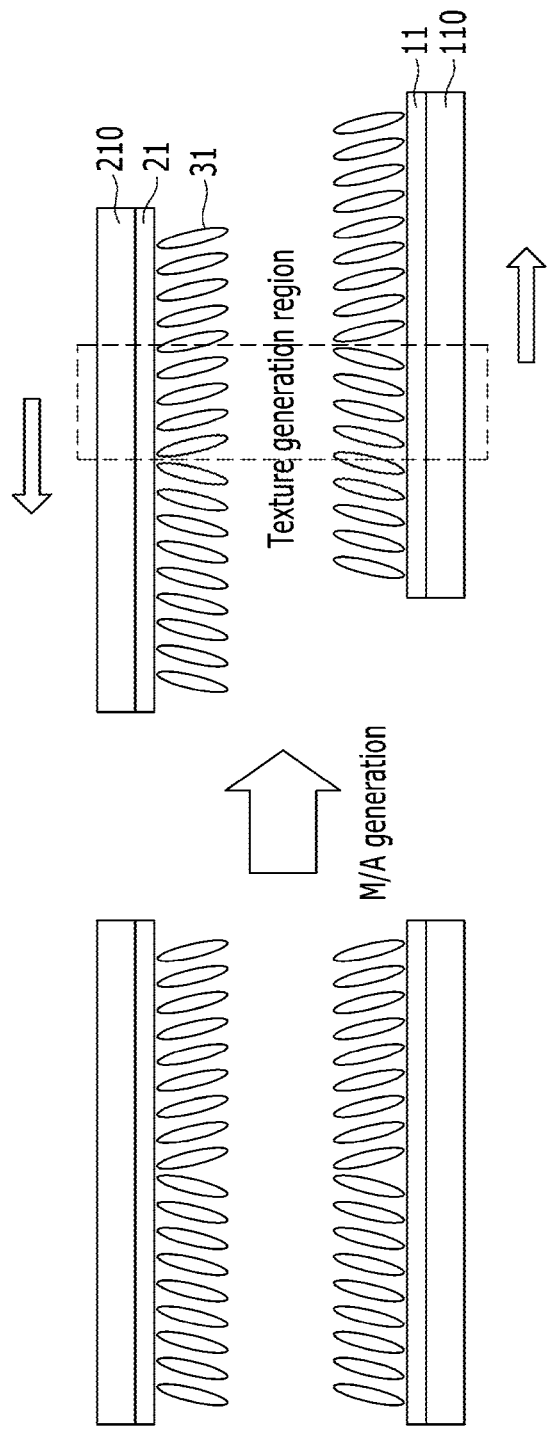
FIG. 8 is a view explaining a texture failure of a conventional liquid crystal display.

FIG. 8 is a view explaining a texture failure of a conventional liquid crystal display. FIG. 9 is a simulation view showing a texture failure of a conventional liquid crystal display.

Figure 9:
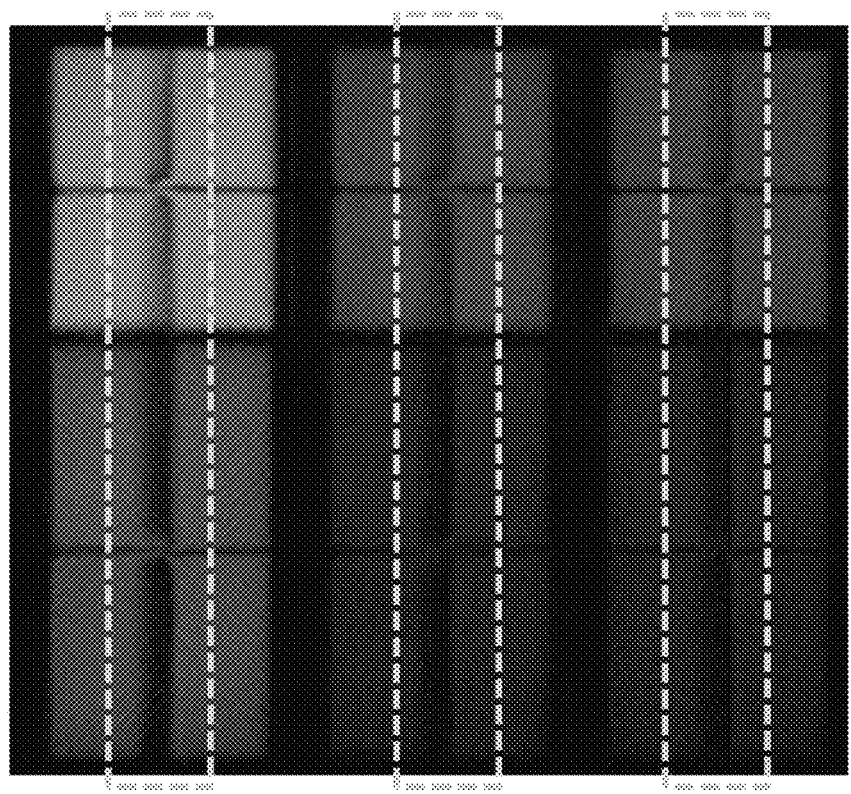
FIG. 9 is a simulation view showing a texture failure of a conventional liquid crystal display.

Referring to FIG. 8 and FIG. 9, the liquid crystal molecules 31 interposed between the first alignment layer 11 and the second alignment layer 21 facing each other form the pre-tilt in the same direction. Next, if the display panel is bent to form the curved display panel, the alignment between the first insulation substrate 110 and the second insulation substrate 210 is twisted, and as a result, like a part indicated by a quadrangle formed of a dotted line of a right view of FIG. 8, a region where the pretilt direction of the liquid crystal molecules 31 disposed on the first alignment layer 11 and the pretilt direction of the liquid crystal molecules 31 disposed on the second alignment layer 21 are misaligned is generated. In this region, because the inclination directions of the liquid crystal molecules 31 are different, the texture failure on the screen appears.

Differently from this, in the liquid crystal display according to another exemplary embodiment, when the pre-tilt angle of the liquid crystal molecules 31 disposed on the first alignment layer 11 and the pre-tilt angle of the liquid crystal molecules 31 disposed on the second alignment layer 21 are different from each other, the texture generated on the screen may be smoothed and prevented.

Figure 10:
FIG. 10 is a view explaining a luminance difference depending on a pre-tilt angle of a liquid crystal molecule disposed near a first insulation substrate and a second insulation substrate.
Figure 11:
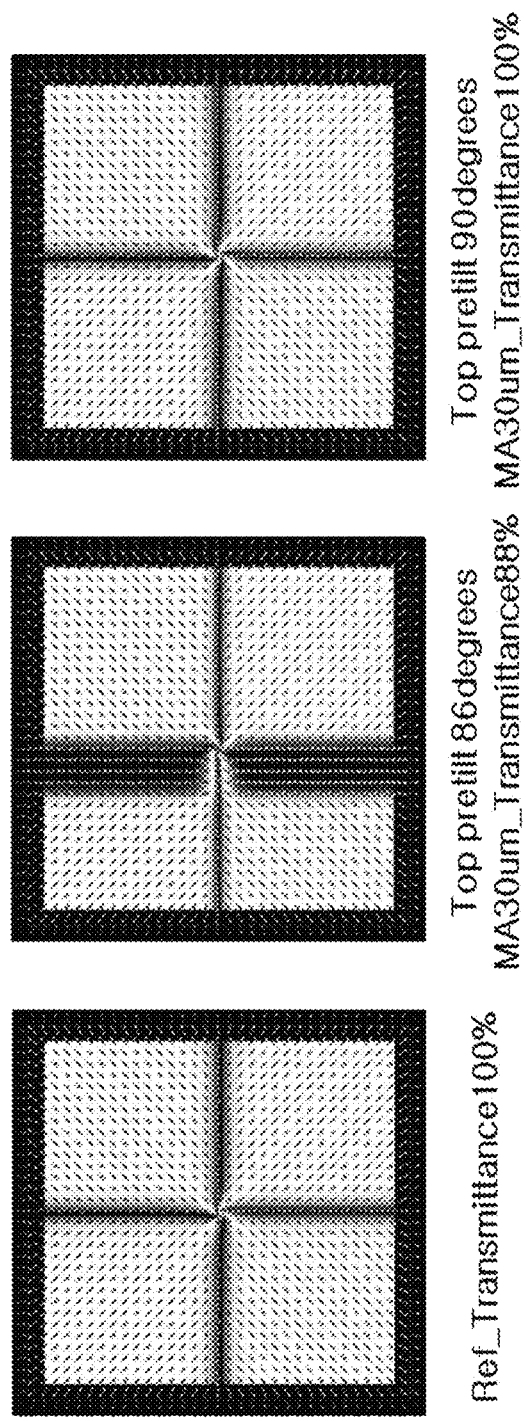
FIG. 11 is a view showing transmittance depending on a pre-tilt angle of a liquid crystal molecule disposed near a second insulation substrate.

FIG. 10 is a view explaining a luminance difference depending on a pre-tilt angle of liquid crystal molecules disposed near a first insulation substrate and a second insulation substrate, and FIG. 11 is a view showing transmittance depending on a pre-tilt angle of liquid crystal molecules disposed near a second insulation substrate.

Referring to FIG. 10, when the pre-tilt angle of the liquid crystal molecules disposed to be adjacent to the first insulation substrate is 89 degrees, it may be confirmed that the luminance difference is changed depending on the pre-tilt angle of the liquid crystal molecule disposed to be adjacent to the second insulation substrate on the misalignment of the first insulation substrate and the second insulation substrate.

The luminance difference caused by misalignment of the first insulation substrate and the second insulation substrate may be reduced by setting the pre-tilt angle of the liquid crystal molecules disposed adjacent to the second insulation substrate to be close to 90 degrees with respect to the surface of the second insulation substrate surface.

Referring to FIG. 11, when the pre-tilt angle of the liquid crystal molecules disposed to be adjacent to the second insulation substrate is 90 degrees compared with 86 degrees, it may be confirmed that the transmittance is high on the misalignment MA of the first insulation substrate and the second insulation substrate.

As described above, in the liquid crystal display according to an exemplary embodiment, by forming the liquid crystal molecules 31 disposed to be adjacent to the first alignment layer 11 to have the pre-tilt angle of more than 80 degrees to less than 89 degrees with respect to the surface of the first alignment layer 11 and the liquid crystal molecules 31 disposed to be adjacent to the second alignment layer 21 to have the pre-tilt angle of more than 89 degrees to less than 90 degrees with respect to the surface of the second alignment layer 21, the luminance difference may be reduced and the transmittance may be improved on the misalignment of the first insulation substrate and the second insulation substrate.

Next, exemplary embodiments forming the alignment layer to generate the difference between the pre-tilt angle of the lower panel side and the pre-tilt angle of the upper panel side will be described with reference to FIG. 12 to FIG. 15.

Figure 12:
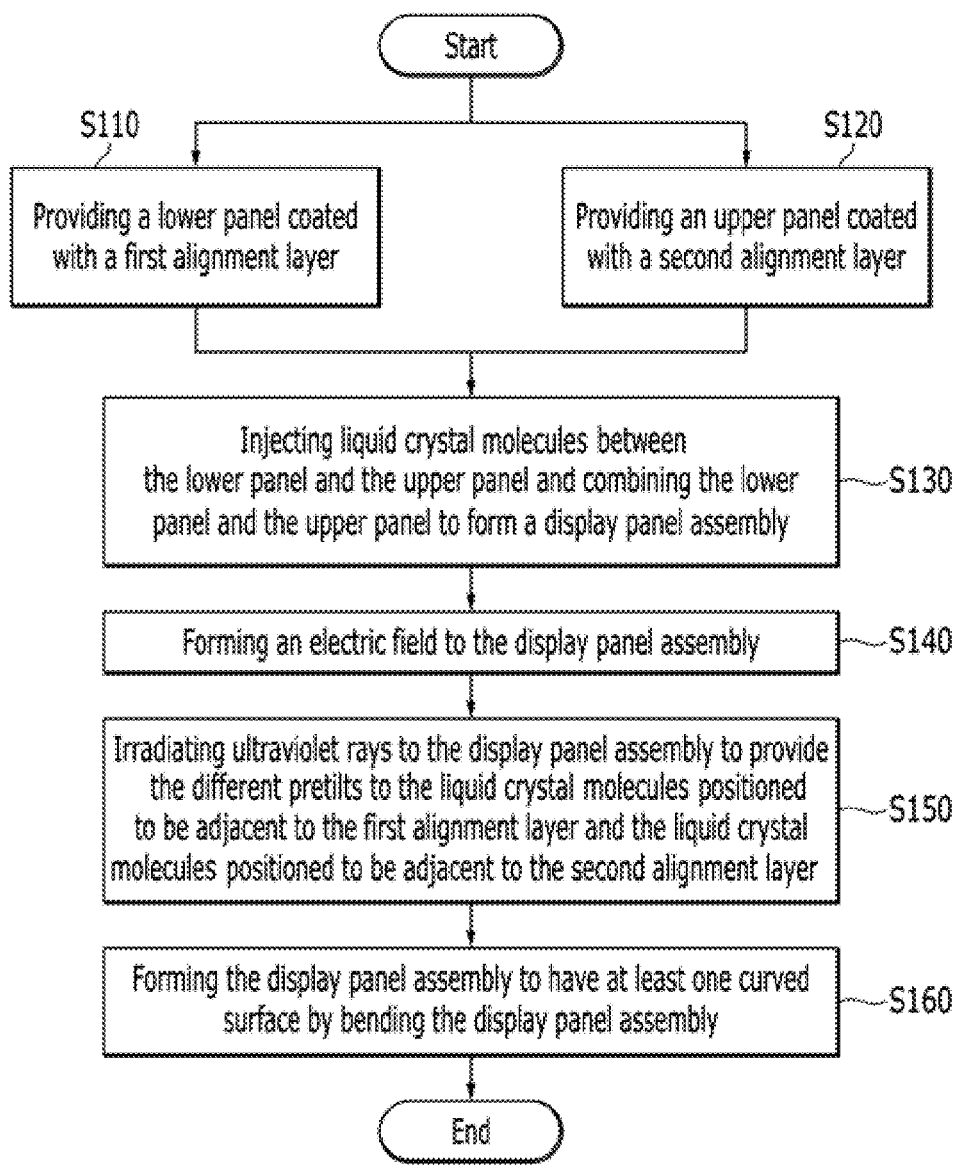
FIG. 12 is a flowchart of a manufacturing method of a liquid crystal display according to an exemplary embodiment.
Figure 13:
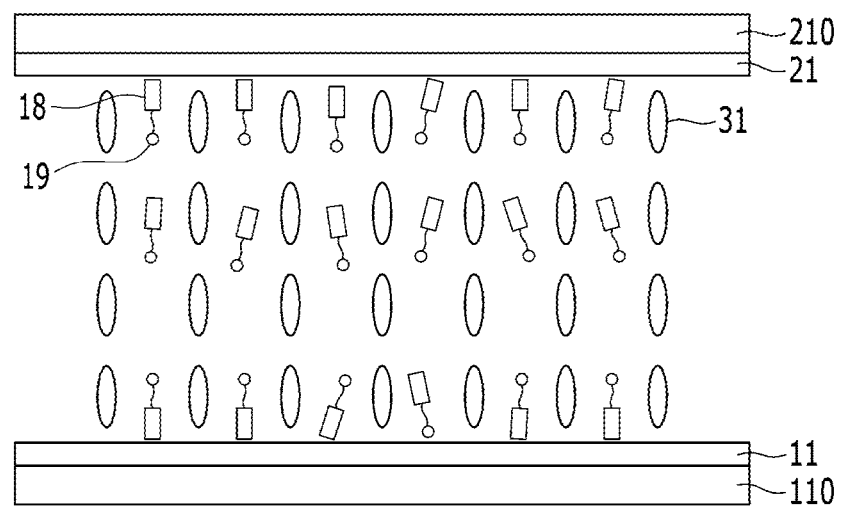
FIGS. 13, 14, and 15 are views showing a process of differentiating a pre-tilt angle of liquid crystal molecules disposed near a first alignment layer and a pre-tilt angle of liquid crystal molecules disposed near a second alignment layer by ultraviolet rays.
Figure 14:
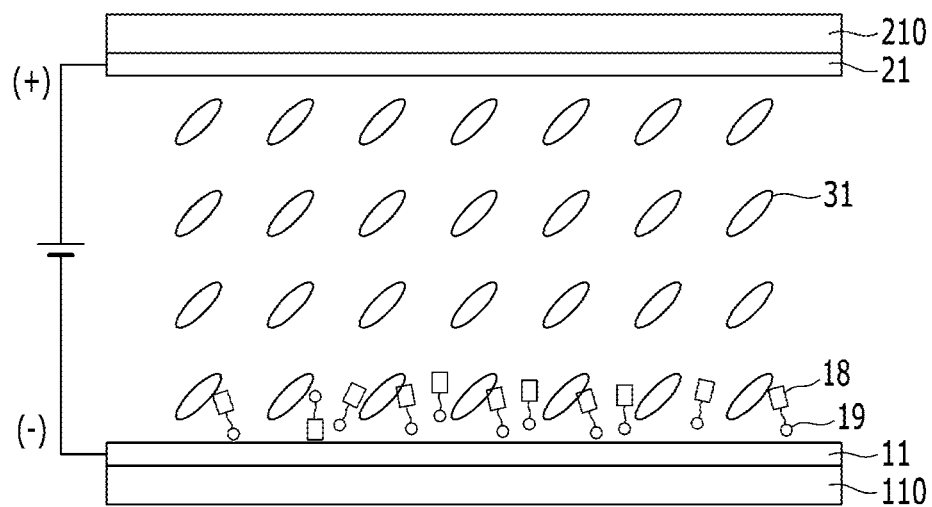
Figure 15:
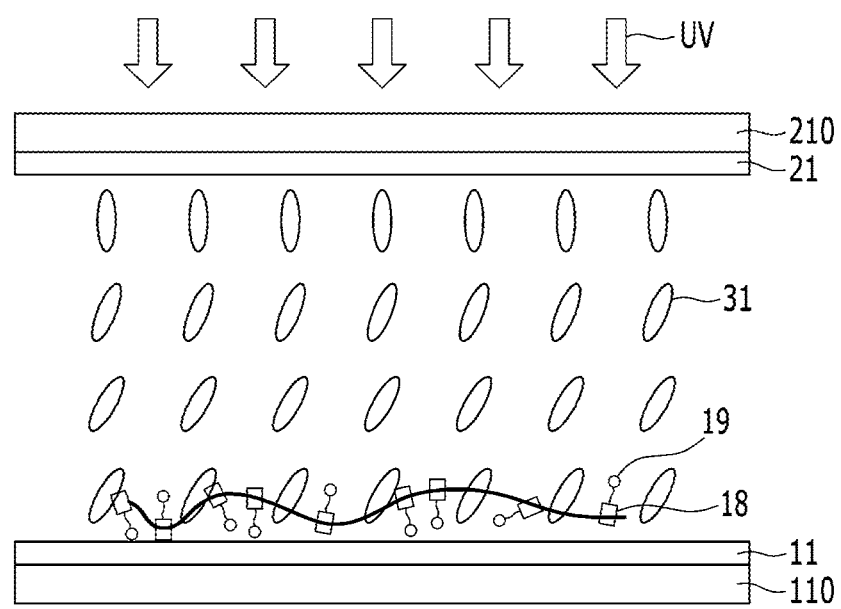

FIG. 12 is a flowchart of a manufacturing method of a liquid crystal display according to an exemplary embodiment, and FIG. 13 to FIG. 15 are views showing a process of differentiating a pre-tilt angle of liquid crystal molecules disposed near a first alignment layer and a pre-tilt angle of liquid crystal molecules disposed near a second alignment layer by ultraviolet rays.

First, referring to FIG. 12 and FIG. 13, a lower panel coated with a first alignment layer 11 and an upper panel coated with a second alignment layer 21 are provided in S110 and S120.

In this case, as described above, the first alignment layer 11 and the second alignment layer 21 include the main chain and at least one side chain connected to the main chain, and at least one side chain may include one or more kinds of integration type of reactive mesogen side chains.

Next, liquid crystal is injected between the lower panel and the upper panel, and the panels are combined to form the display panel assembly S130.

In this case, a liquid crystal layer formed between the lower panel and the upper panel may include the reactive mesogen 18 and the ammonium-based material 19 connected to the reactive mesogen 18.

Next, referring to FIG. 12 and FIG. 14, the electric field is formed to the display panel assembly S140.

The data voltage is applied to the pixel electrode by applying a voltage to a gate line and a data line formed in the lower panel, and an electric field is formed to the liquid crystal layer between the two display panels by applying a common voltage of the common electrode of the upper panel.

During the formation of the electric field, since the coupling unit of the separation type of reactive mesogen 18 and the ammonium-based material 19 has the positive (+) polarity, the separation type of reactive mesogen 18 is moved to the lower panel having the negative (−) polarity.

Next, referring to FIG. 12 and FIG. 15, ultraviolet rays are irradiated while the electric field is formed to the display panel assembly, and the pre-tilt angle of the liquid crystal molecules 31 disposed to be adjacent to the first alignment layer 11 and the pre-tilt angle of the liquid crystal molecules 31 disposed to be adjacent to the second alignment layer 21 are differently formed S150.

Ultraviolet rays are irradiated to the first alignment layer 11 disposed with the separation type of reactive mesogen 18 and the second alignment layer 21 without the separation type of reactive mesogen 18.

If ultraviolet rays are irradiated, the photoreactive groups included in the separation type of reactive mesogen 18 having moved to the lower panel react with each other to form a cross-linking portion, and the cross-linking portion may have the pretilt.

That is, since the separation type of reactive mesogen 18 is disposed on the surface of the first alignment layer 11, the pretilt is formed by the separation type of reactive mesogen 18, and the liquid crystal molecules 31 disposed to be adjacent to the first alignment layer 11 may be aligned while having the pretilt of more than 80 degrees to less than 89 degrees with respect to the surface of the first alignment layer 11.

In contrast, since the reactive mesogen 18 is not included in the surface of the second alignment layer 21 such that the cross-linking portion is not formed, the liquid crystal molecules 31 disposed to be adjacent to the second alignment layer 21 may be aligned while having the pretilt of more than 80 degrees to less than 89 degrees with respect to the surface of the second alignment layer 21.

Next, by bending the display panel assembly, the display panel assembly is formed to have at least one curved surface S160.

Next, the manufacturing method of the liquid crystal display according to another exemplary embodiment will be described with reference to FIG. 16 to FIG. 20.

Figures 16, 17:
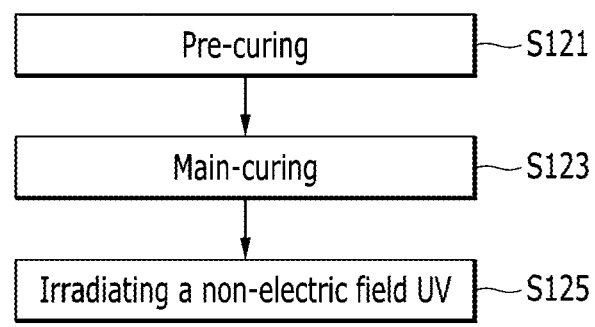
FIG. 16 is a flowchart of a manufacturing method of a liquid crystal display according to another exemplary embodiment.
FIG. 17 and FIG. 18 are views explaining a method of forming a pre-tilt angle through a main heat treatment for a second alignment layer.
Figure 18:
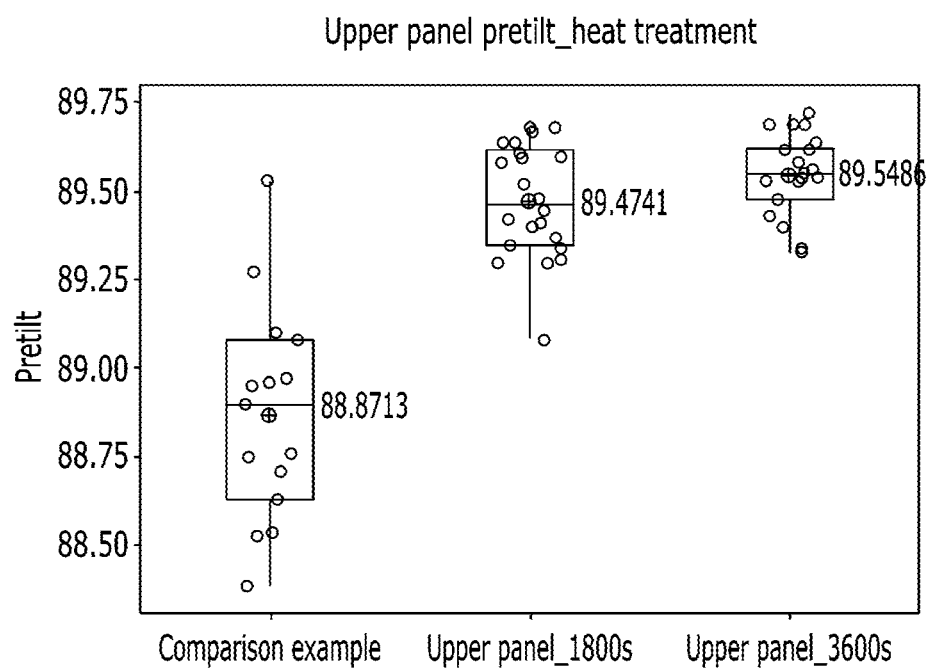
Figure 20:
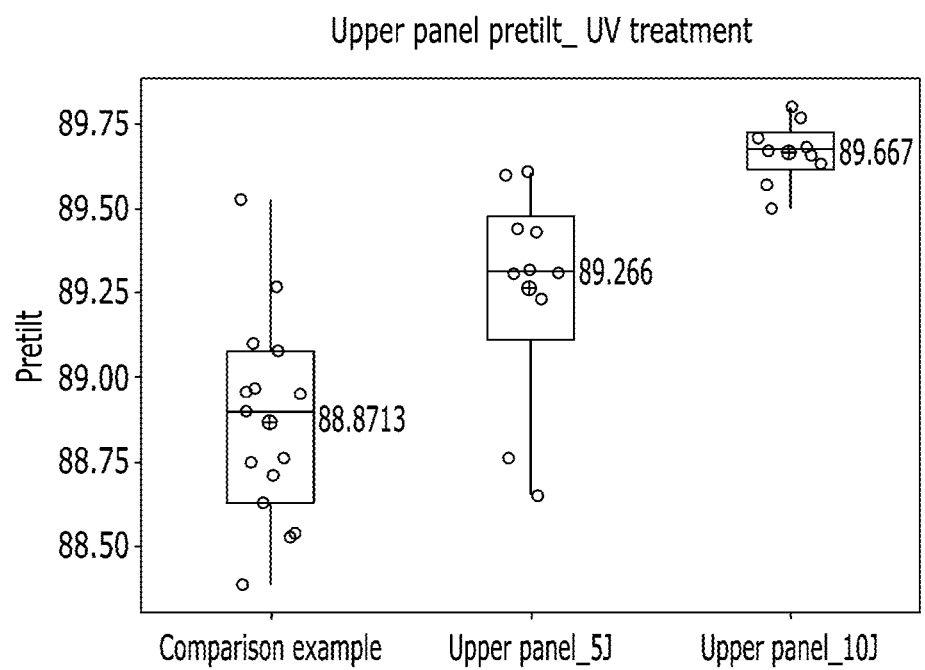

FIG. 16 is a flowchart of a manufacturing method of a liquid crystal display according to another exemplary embodiment. FIG. 17 and FIG. 18 are views explaining a method of forming a pre-tilt angle through a main heat treatment for a second alignment layer. FIG. 19 and FIG. 20 are views explaining a method of forming a pre-tilt angle by irradiating non-electric field ultraviolet rays exposure process to an upper panel.

Referring to FIG. 16, a step (S120) of providing the upper panel may further include pre-heat-treating (pre-curing) the second alignment layer 21 (S121), main-heat-treating the second alignment layer 21 (S123), and irradiating non-electric field ultraviolet rays exposure process (S125).

The above-described integration type of reactive mesogen side chain may be included in the second alignment layer 21.

First, the second alignment layer 21 is pre-heat treated (pre-cured) (S121).

The pre-heat treatment (pre-cure) performs heating at, for example, about 70-100° C., and accordingly, the solvent of the alignment material is heated and the mixture in the alignment material is phase-separated. The phase separation is generated by a polarity difference of the components in the alignment material, and in the case, the material having relatively larger polarity is moved near the electrode and the material having the relatively smaller polarity is moved thereon.

Next, the second alignment layer 21 is main heat treated (S123).

The main-heat treatment is performed at a heating temperature of about 200-250° C., for example.

In this case, the main heat treatment is performed for more than 30 minutes, thereby forming the pre-tilt angle of the second alignment layer 21 of more than 89 degrees to less than 90 degrees.

Referring to FIG. 17 and FIG. 18, as the main-heat treatment is performed to the upper panel for longer than 30 minutes, the pre-tilt angle of the second alignment layer 21 may be formed to be close to 90 degrees.

Next, after the main-heat treatment, the non-electric field ultraviolet rays exposure process may be additionally irradiated to the upper panel (S125).

Referring to FIG. 19 and FIG. 20, when the non-electric field ultraviolet rays exposure process are irradiated after the main-heat treatment, it may be confirmed that the pre-tilt angle of the second alignment layer 21 is more than 89 degrees to less than 90 degrees.

When the time of the main-heat treatment is lengthened or the non-electric field ultraviolet rays exposure process are irradiated to the upper panel including the second alignment layer 21, reactivity of a free radical existing in the second alignment layer 21 is increased such that the reaction coupling of the reactive mesogen may be actively generated. Accordingly, in the step of forming the UV electric field exposure to the display panel assembly (S140), the reactivity of the integration type of reactive mesogen included in the second alignment layer 21 is minimized, thereby forming the pre-tilt angle of the second alignment layer 21 of more than 89 degrees to less than 90 degrees.

As described above, the liquid crystal display according to an exemplary embodiment may be incorporated into the curved liquid crystal panel without concern of undesirable effects of misalignment. More specifically, the pre-tilt angle of the liquid crystal molecules disposed in the upper panel being formed at more than 89 degrees to less than 90 degrees reduces or prevents the dark portion such as the texture due to the misalignment.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

DESCRIPTION OF SYMBOLS

GL, 121: gate line RL, 131: voltage divided reference voltage line
DL, 171: data line Clca, Clab: liquid crystal capacitor
Qa, Qb, Qc: switching element (thin film transistor)
110, 210: substrate 124a, 124b, 124c: gate electrode
140: gate insulating layer 154a, 154b, 154c, 157: semiconductor layer
163a, 165a, 163b, 165b, 163c, 165c: ohmic contact
173a, 173b, 173c: source electrode 175a, 175b, 175c: drain electrode
180p, 180q: passivation layer 191a, 191b: sub-pixel electrode
220: black matrix 230: color filter
11: first alignment layer 12: first photo-alignment layer
13: vertical alignment side chain 14: main reactive mesogen side chain
15: sub-reactive mesogen side chain 18: reactive mesogen
19: ammonium-based material 21: second alignment layer
22: main chain

What is claimed is:

1. A liquid crystal display comprising:
a first insulation substrate;
a second insulation substrate facing the first insulation substrate;
a liquid crystal layer disposed between the first insulation substrate and the second insulation substrate;
a pixel electrode disposed on the first insulation substrate;
a first alignment layer disposed on the pixel electrode;
a cross-linking portion, the cross-linking portion being a portion where separation type of reactive mesogens disposed in a surface of the first alignment layer are coupled with one another;
a common electrode disposed between the liquid crystal layer and the second insulation substrate;
a second alignment layer disposed between the liquid crystal layer and the common electrode; and
wherein liquid crystal molecules disposed to be adjacent to the first alignment layer and liquid crystal molecules disposed to be adjacent to the second alignment layer have different pre-tilt angles,
wherein at least one of the separation type of reactive mesogens is coupled with an ammonium-based material,
wherein the separation type of reactive mesogen and the ammonium-based material are coupled to have a positive polarity,
wherein each of the first alignment layer and the second alignment layer includes a main chain and at least one side chain connected to the main chain, and
wherein the side chain includes a main reactive mesogen side chain and a sub-reactive mesogen side chain, and a length of the main reactive mesogen side chain is longer than a length of the sub-reactive mesogen side chain.

2. The liquid crystal display of claim 1, wherein:
the liquid crystal molecules disposed to be adjacent to the first alignment layer has the pre-tilt angle of more than 80 degrees to less than 89 degrees with respect to the surface of the first alignment layer; and
the liquid crystal molecules disposed to be adjacent to the second alignment layer has the pre-tilt angle of more than 89 degrees to less than 90 degrees with respect to the surface of the second alignment layer.

3. The liquid crystal display of claim 1, wherein the ammonium-based material includes one among tetramethylammonium hydroxide (TMAH), tetramethylammonium chloride (TMAC), or an alkylammonium series.

4. The liquid crystal display of claim 1, wherein the separation type of reactive mesogen includes a photoreactive group.

5. The liquid crystal display of claim 4, wherein the photoreactive group includes an acrylate-based monomolecule.

6. The liquid crystal display of claim 5, wherein the acrylate-based monomolecule includes a fluorine aryl acrylate-based monomolecule.

7. The liquid crystal display of claim 1, wherein the side chain includes an integration type of reactive mesogen side chain which includes at least one of an acryl or methacryl group on an end.

8. The liquid crystal display of claim 1, wherein the main chain includes one selected from a group including polyimide, polyamic acid, polyamide, polyamicimide, polyester, polyethylene, polyurethane, and polystyrene.

9. The liquid crystal display of claim 1, wherein the liquid crystal display is curved.

10. The liquid crystal display of claim 1, wherein the pixel electrode includes a first sub-pixel electrode and a second sub-pixel electrode including a cross-shape stem and a plurality of minute branches.

11. The liquid crystal display of claim 10, wherein the pixel electrode is divided into four sub-regions by the cross-shape stem.

12. The liquid crystal display of claim 11, wherein the minute branches of each sub-region extend in different directions.

13. A liquid crystal display comprising:
a first insulation substrate;
a second insulation substrate facing the first insulation substrate;
a liquid crystal layer disposed between the first insulation substrate and the second insulation substrate;
a pixel electrode disposed on the first insulation substrate;
a first alignment layer disposed on the pixel electrode;
a cross-linking portion, the cross-linking portion being a portion where a separation type of reactive mesogens disposed in a surface of the first alignment layer are coupled with one another;
a common electrode disposed between the liquid crystal layer and the second insulation substrate; and
a second alignment layer disposed between the liquid crystal layer and the common electrode; and
wherein liquid crystal molecules disposed to be adjacent to the first alignment layer and liquid crystal molecules disposed to be adjacent to the second alignment layer have different pre-tilt angles,
wherein at least one of the separation type of reactive mesogens is coupled with an ammonium-based material,
wherein each of the first alignment layer and the second alignment layer includes a main chain and at least one side chain connected to the main chain,
wherein the side chain includes a main reactive mesogen side chain and a sub-reactive mesogen side chain, and a length of the main reactive mesogen side chain is longer than a length of the sub-reactive mesogen side chain, and
wherein the ammonium-based material is represented by one of Chemical Formula 2, Chemical Formula 3, Chemical Formula 4, Chemical Formula 5, and Chemical Formula 6:

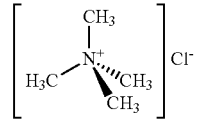
(Chemical Formula 2)

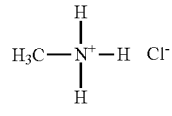
(Chemical Formula 3)

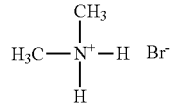
(Chemical Formula 4)

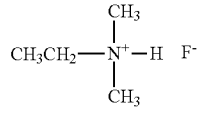
(Chemical Formula 5)

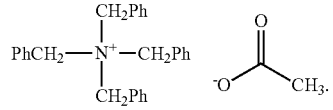
(Chemical Formula 6)

* * * * *